(12) United States Patent
Andersson et al.

(10) Patent No.: US 11,176,234 B2
(45) Date of Patent: Nov. 16, 2021

(54) METHOD FOR TRANSITIONING A DEVICE CONTROLLER OF AN ELECTRONIC DEVICE

(71) Applicant: FINGERPRINT CARDS AB, Gothenburg (SE)

(72) Inventors: Markus Andersson, Staffanstorp (SE); Fredrik Ramberg, Gothenburg (SE); Hans Thörnblom, Kungsbacka (SE); Gabriel Rundlöf, Gothenburg (SE); Hamid Sarve, Gothenburg (SE); Troels Bjerre, Valby (DK)

(73) Assignee: FINGERPRINT CARDS AB, Gothenburg (SE)

( * ) Notice: Subject to any disclaimer, the term of this patent is extended or adjusted under 35 U.S.C. 154(b) by 207 days.

(21) Appl. No.: 16/605,416

(22) PCT Filed: Apr. 17, 2018

(86) PCT No.: PCT/SE2018/050388
§ 371 (c)(1),
(2) Date: Oct. 15, 2019

(87) PCT Pub. No.: WO2018/199831
PCT Pub. Date: Nov. 1, 2018

(65) Prior Publication Data
US 2021/0124814 A1    Apr. 29, 2021

(30) Foreign Application Priority Data
Apr. 24, 2017   (SE) .................... 1750489-5

(51) Int. Cl.
*G06F 3/041*     (2006.01)
*G06F 21/32*     (2013.01)
(Continued)

(52) U.S. Cl.
CPC ............ *G06F 21/32* (2013.01); *G06F 3/0414* (2013.01); *G06F 3/0416* (2013.01);
(Continued)

(58) Field of Classification Search
CPC .... G06F 3/0414; G06F 3/0416; G06F 3/0443; G06F 21/32; G06F 2221/2149;
(Continued)

(56) References Cited

U.S. PATENT DOCUMENTS 6,408,087 B1 * 6/2002 Kramer ............... G06F 3/04166
382/124
8,031,046 B2  10/2011 Franza et al.
(Continued)

OTHER PUBLICATIONS

PCT International Search Report and Written Opinion dated May 28, 2018 for International Application No. PCT/SE2018/050388, 9 pages.

*Primary Examiner* — Ryan A Lubit
(74) *Attorney, Agent, or Firm* — RMCK Law Group, PLC

(57) ABSTRACT

The present invention relates to a method for transitioning a device controller comprised with an electronic device from an at least partly inactive mode to an at least partly active mode, wherein the method comprises: determining the area portion of a finger detecting structure being touched by an object; determining a force applied on the fingerprint sensing device. When the area portion of the finger detecting structure being touched by the object exceeds a predetermined threshold area portion, and the force exceeds a predetermined threshold force value, transitioning, using the pre-processing module, the device controller from the at least partly inactive mode to the at least partly active mode. The invention also relates to such an electronic device.

28 Claims, 10 Drawing Sheets

(51) Int. Cl.
  *G06K 9/00* (2006.01)
  *G06F 3/044* (2006.01)

(52) U.S. Cl.
  CPC ......... *G06F 3/0443* (2019.05); *G06K 9/0002* (2013.01); *G06F 2221/2149* (2013.01)

(58) Field of Classification Search
  CPC ............. G06K 9/00013; G06K 9/0002; G06K 9/00087; G06K 9/0012
  See application file for complete search history.

(56) References Cited

U.S. PATENT DOCUMENTS

| | | | |
|---|---|---|---|
| 9,589,171 B1 | 3/2017 | Larsson et al. | |
| 2008/0030302 A1* | 2/2008 | Franza | G06K 9/00006 340/5.83 |
| 2008/0166028 A1* | 7/2008 | Turek | G06K 9/0002 382/124 |
| 2011/0298711 A1* | 12/2011 | Dean | G06F 3/03545 345/161 |
| 2013/0263252 A1* | 10/2013 | Lien | G06F 1/3215 726/19 |
| 2014/0096622 A1 | 4/2014 | Kawate | |
| 2015/0149899 A1* | 5/2015 | Bernstein | G06F 3/016 715/702 |
| 2016/0170548 A1* | 6/2016 | Suzuki | G06F 3/0416 345/174 |
| 2016/0188181 A1* | 6/2016 | Smith | G06F 3/04817 715/765 |
| 2016/0253041 A1* | 9/2016 | Park | G06F 3/0445 345/174 |
| 2016/0342241 A1* | 11/2016 | Chung | A61B 5/6898 |
| 2017/0255338 A1* | 9/2017 | Medina | G06F 3/0416 |
| 2017/0372122 A1* | 12/2017 | Shim | G06K 9/00087 |
| 2018/0196990 A1* | 7/2018 | Xu | G06K 9/00087 |
| 2018/0224955 A1* | 8/2018 | Chen | G06F 3/0446 |
| 2018/0276440 A1* | 9/2018 | Strohmann | G06K 9/0008 |
| 2019/0205604 A1* | 7/2019 | Ryshtun | G06F 3/041 |

* cited by examiner

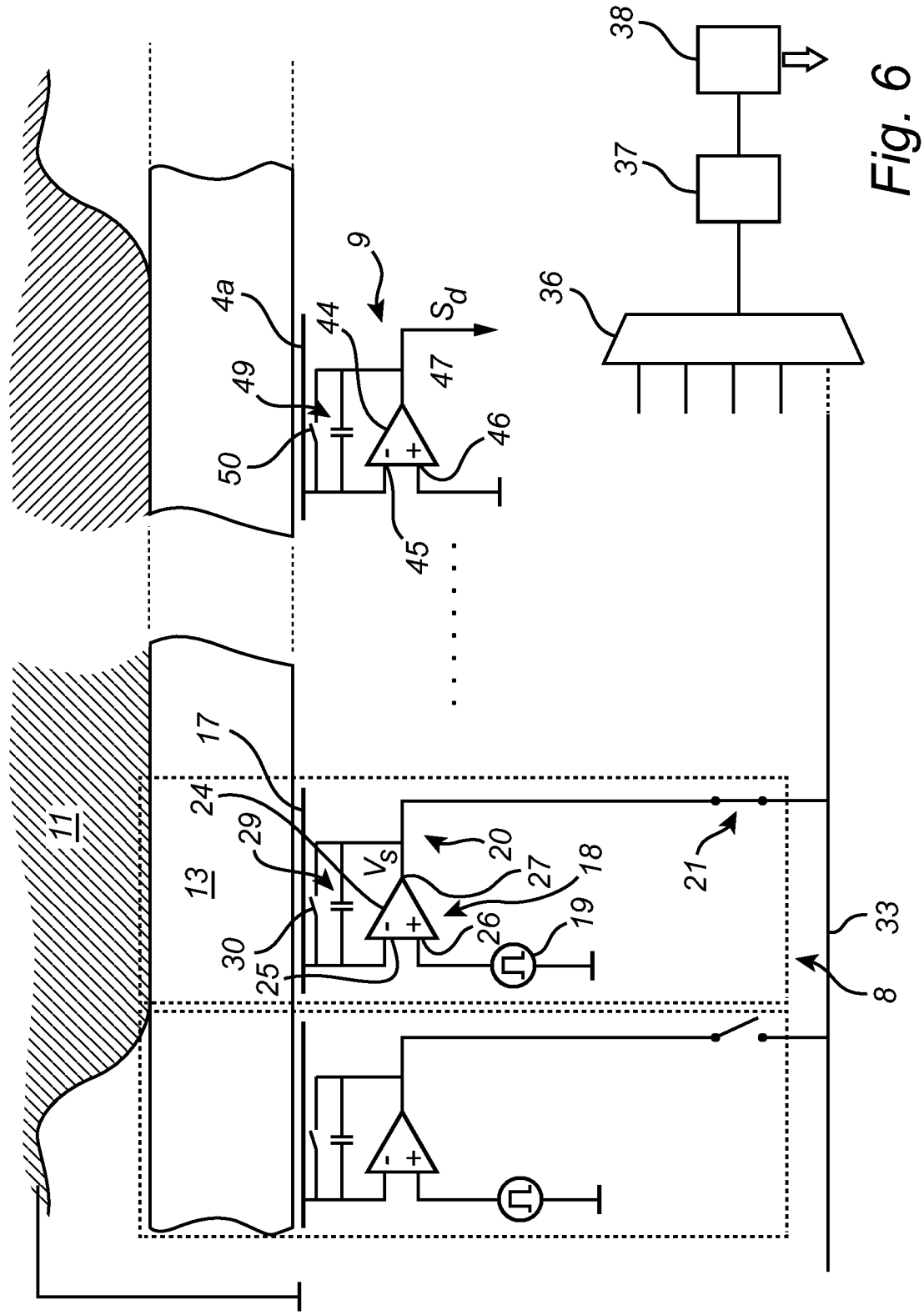

METHOD FOR TRANSITIONING A DEVICE CONTROLLER OF AN ELECTRONIC DEVICE

CROSS-REFERENCE TO RELATED APPLICATIONS

This application is a 371 U.S. National Stage of International Application No. PCT/SE2018/050388, filed Apr. 17, 2018, which claims priority to Swedish Patent Application No. 1750489-5, filed Apr. 24, 2017. The disclosures of each of the above applications are incorporated herein by reference in their entirety.

FIELD OF THE INVENTION

The present invention relates to a method for transitioning a device controller comprised with an electronic device from an at least partly inactive mode to an at least partly active mode. The present invention further relates to such an electronic device.

BACKGROUND OF THE INVENTION

Various types of biometric systems are used more and more in order to provide for increased security and/or enhanced user convenience.
In particular, fingerprint sensing systems have been adopted in, for example, consumer electronic devices, thanks to their small form factor, high performance and user acceptance.

To provide for a low energy consumption of the fingerprint sensing system, the fingerprint sensing system should only operate when there is a finger on the fingerprint sensing device comprised in the fingerprint sensing system. On the other hand, the fingerprint sensing system may be required to independently determine whether or not a finger is present on the sensing device and to sense the fingerprint pattern of the finger when the finger is placed on the sensing device.

U.S. Pat. No. 8,031,046 discloses a finger sensing device in which finger sensing electrodes may be bussed together and connected to a bussed electrode amplifier which is typically maintained on. A sample and hold and decoder circuit is connected to the bussed electrode amplifiers and may output an average power from the bussed group of electrodes that is compared with a threshold level. If the average power is higher than the threshold level, it is determined that the finger is present, and a fingerprint image is acquired.

Although the solution proposed by U.S. Pat. No. 8,031,046 seems to provide for a rather energy-efficient finger detect functionality, there still appears to be room for improvement.

SUMMARY

In view of above-mentioned and other drawbacks of the prior art, it is an object of the present invention to provide an improved finger detect procedure, in particular providing for more energy efficient operation of the electronic device comprising a fingerprint sensing device.

According to a first aspect of the present invention, it is therefore provided a method for transitioning a device controller comprised with an electronic device from an at least partly inactive mode to an at least partly active mode, the electronic device further comprising: a fingerprint sensing device comprising a sensing area, the fingerprint sensing device is configured to capture a fingerprint image of a finger touching the sensing area, a force sensing module configured to determine a force applied on the fingerprint sensing device, a finger detecting structure arranged adjacent to the fingerprint sensing device, the finger detecting structure being connected to finger detector circuitry configured to generate a signal indicative of an object touching at least a portion of the finger detecting structure, wherein a magnitude of the signal is indicative of the area portion of the finger detecting structure being touched by the object, and a pre-processing module, wherein the method comprises: determining the area portion of the finger detecting structure being touched by the object; determining a force applied on the fingerprint sensing device; wherein, when the area portion of the finger detecting structure being touched by the object exceeds a predetermined threshold area portion, and the force exceeds a predetermined threshold force value, transitioning, using the pre-processing module, the device controller from the at least partly inactive mode to the at least partly active mode.

The present invention is based upon the realization that a low power finger detect method and system can be provided by requiring that the finger detecting structure has been touched and that a sufficient force has been applied. Only when at least these two conditions have been fulfilled may the device controller be transitioned to the at least partly active mode. By requiring both a touch condition and a force condition to be fulfilled before transitioning the device controller reduces the amount of false wake-up events for the device controller. For example, a conductive material may trigger a finger detect functionality which thereby may falsely wake up the host. Such a conductive material may for example be a metal object (e.g. a key) or wet object (e.g. a wet napkin) located in the same pocket as for example a mobile phone with a fingerprint sensing device having finger detect functionality. However, by also requiring a sufficient force to be applied will reduce the likelihood that such a conductive object triggers a wake-up event for the device controller. A wake-up event should be understood as included in a transition from the at least partly inactive mode to the at least partly active mode. Furthermore, by requiring that a threshold area of the finger detecting structure to be covered by the object (e.g. finger), false wake-up event may be further avoided. The area portion threshold may for example be tailored to relate to the size of a finger more than other objects which may otherwise trigger false wake-up events.

The force determined by the force sensing module may be a relative force or an absolute force.

The force sensing module may be a hardware force sensor. For example, a hardware force sensor may be a piezoelectric material based sensor, a strain gauge, a resistive force sensor, or a quantum tunneling composite based force sensor, or an optical force sensor. With a hardware based force sensing module, it is possible to determine an absolute force and/or a relative force.

Alternatively or additionally, the force sensing module may be a software based force determination application run on a processor. Such a software based application may determine a relative applied force by comparing fingerprint images in a sequence of fingerprint images and determine the relative applied force depending fingerprint deformations detectable in the fingerprint images caused by the applied force. The deformations may be detected in the sequence of images and may be used for estimating a relative force applied when a subsequent image was acquired compared to when a prior image was acquired.

Accordingly, with software based force sensing module it is only possible to determine a relative force.

The area portion of the finger detecting structure being touched by an object (e.g. a finger) may range from zero, i.e. the finger detecting structure is not touched at all to that the entire finger detecting structure is being touched.

It should further be noted that there may be more than one finger detecting structures, or one finger detecting structure may comprise sub-structures. In case of sub-structures each of the substructures may function in a digital manner, i.e. "touch" or "no touch" whereby the "area portion" is related to the number of sub-portions being touched by an object. Furthermore, In case of the digital manner finger detect, the finger detecting structure may be a sensing structure (i.e. the top plate of a pixel) of the fingerprint sensing device in case of a capacitive fingerprint sensing device.

With an analogue finger detecting functionality, it is instead the capacitive coupling between the object and the finger detecting structure that determines the area portion of the finger detecting structure that is being touched. The area portion may as mentioned range from zero to that the entire finger detecting structure is touched. Thereby, the signal may range from a low value indicative of a small area being touched and a large value indicative of a large area being touched or vice versa. Also in this case of an analogue finger detecting functionality there may be more than one finger detecting structure, such as two, three, four, five six seven or even eight finger detecting structures. However, the area portion that is being touched may relate to the area portion of a single finger detect structure. The finger detecting structure may advantageously be provided in the form of a metal plate. Additionally or alternatively, each of the finger detecting structures is a capacitive plate for sensing a capacitive coupling between the finger and the capacitive plate whereby the capacitive coupling is indicative of the area portion being touched by the finger. By the provision of the area portion threshold it is also possible to determine in some embodiments that the finger is correctly placed on the fingerprint sensor for sensing the fingerprint pattern.

In one embodiment, the electronic device may comprise at least two finger detecting structures arranged adjacent to the fingerprint sensing device, each finger detecting structure being connected to finger detector circuitry configured to generate a signal indicative of an object touching at least a portion of the respective finger detecting structure, wherein a magnitude of each of the signals is indicative of the area portion of the respective finger detecting structure being touched by the object, wherein the step of determining the area portion of the finger detecting structure being touched by the object comprises determining the area portion being touched by the object for each finger detecting structure, wherein for transitioning, using the pre-processing module, the device controller from the at least partly inactive mode to the at least partly active mode, each of the area portion is required exceed a respective threshold area portion.

The threshold area portion may be the same for all or some the finger detecting structures, and/or some finger detecting structures may have different threshold area portions.

In one embodiment, the electronic device may comprise at least two finger detecting structures arranged adjacent to the fingerprint sensing device, each finger detecting structure being connected to finger detector circuitry configured to generate a signal indicative of an object touching at least a portion of the respective finger detecting structure, wherein a magnitude of each of the signals is indicative of the area portion of the respective finger detecting structure being touched by the object, wherein the step of determining the area portion of the finger detecting structure being touched by the object comprises determining a combined area portion being touched by the object based on the area portion being touch for each finger detecting structure, wherein for transitioning, using the pre-processing module, the device controller from the at least partly inactive mode to the at least partly active mode, the combined area portion is required exceed a threshold area portion.

The pre-processing module may be comprised in a fingerprint sensing system comprising the fingerprint sensing device or it may be a separate dedicated processor run on the electronic device.

Additionally, the device controller may be part of the electronic device itself or the device controller may be comprised in the fingerprint sensing device comprised in the electronic device. In other words, the device controller may be part of the fingerprint sensing device and may be configured to control the fingerprint sensing device to acquire images if prompted to do so. Also in the case of the device controller being part of the electronic device and thus external to the fingerprint sensing device, the device controller may be configured to control the fingerprint sensing device to acquire fingerprint images.

The fingerprint sensing device may be implemented using any kind of current or future fingerprint sensing principle, including for example capacitive, optical, or thermal sensing technology. However, at present capacitive sensing is most preferred. With a capacitive fingerprint sensing device, a measure is detected indicative of the capacitive coupling between each sensing element in an array of sensing elements and a finger surface touching the fingerprint sensing device surface. Sensing elements at locations corresponding to ridges in the fingerprint will exhibit a stronger capacitive coupling to the finger than sensing elements at locations corresponding to valleys in the fingerprint. Both one and two-dimensional sensors are possible and within the scope of the invention.

In case that the fingerprint sensing device is a capacitive sensor the finger detecting structure(s) may be arranged at least partly surrounding the sensing structure in the sensing structure plane, the finger detecting structures being arranged in opposing pairs with respect to the sensing structures. In other words, there may be one finger detecting structure arranged adjacent to each side of the array of sensing elements.

As mentioned, the finger detecting structure may advantageously be provided in the form of a metal plate. Such a metal plate is substantially larger (greater area) than a sensing structure comprised in a sensing element of a capacitive fingerprint sensing device. For instance, the finger detecting structure may be at least 20 times larger than a sensing structure, or more preferably at least 100 times larger. Hereby, the capacitive coupling between the finger detecting structure and the possible finger will be correspondingly stronger than the capacitive coupling between a sensing structure and the possible finger.

The fingerprint sensing device may comprise additional circuitry for operating on sensing signals indicative of the fingerprint pattern detected in the fingerprint image. Such additional circuitry, which may for instance include sampling circuitry and analog-to-digital conversion circuitry. Thus, the fingerprint sensing device may thus provide a fingerprint pattern signal as a digital signal. Alternatively, the fingerprint pattern signal may be provided as an analog signal.

The acquired signals from the finger detecting structure may be analog or digital values indicative of a voltage, which may in turn be proportional to the capacitance of the capacitor constituted by the finger (or other conductive object in the vicinity of the finger detecting structure), the finger detecting structure and the dielectric material there between.

The sensed fingerprint pattern may be used for various purposes, such as biometric enrollment or authentication, or fingerprint pattern based navigation etc.

According to one embodiment, there is further included to determine that the finger is stable with respect to the sensing area of the fingerprint sensing device according to a stability condition, wherein when the finger is determined to be stable on the fingerprint sensing device, transitioning, using the pre-processing module, the device controller from the at least partly inactive mode to the at least partly active mode. Hereby, a further requirement is added that has to be fulfilled before transitioning the device controller which thereby further reduces the amount of false wake-up event which consequently reduces the overall power consumptions further.

In case the fingerprint sensing device is a capacitive sensor, the stability condition may be that a threshold number of sensing elements senses the presence of the finger for at least a predetermined time duration. The threshold number of sensing elements is preferably a plurality of neighboring sensing elements forming a zone of sensing elements. Additionally, the variation in sensing signal from the plurality of sensing signals may be required to not exceed a threshold variation for the predetermined time duration.

The stability condition may include a coverage parameter indicative of a spatial coverage of the fingerprint sensing device, wherein the coverage parameter is determined to fulfill a coverage condition when at least a sub-area, having a predefined shape, of the fingerprint sensing device is covered by the object.

Further, determining that the finger is stable may be based on analyzing a difference between at least two fingerprint images. Such a difference may for example be a difference in image intensity between the fingerprint images. For example, the root-mean-square (RMS) of pixel values between subsequent fingerprint images may be analyzed. A threshold value for the difference between the RMS-values may be used for determining that the finger is stable or not, i.e. if the difference in RMS-values is below a threshold it may be determined that the finger is stable on the fingerprint sensing device.

Another exemplary way of determining the stability of the finger based on at least two fingerprint images may be to analyze a change in intensity range between the images. A first intensity range is then determined in a first image from the difference between high intensity and a low intensity in the first image, and a second intensity range is determined from the difference between high intensity and a low intensity in the second image. Based on the different between the first image intensity range and the second image intensity, it may be determined if the finger is stable or not. For example the difference in image intensity range may be compared to a threshold difference intensity range and if the determined difference in image intensity range is below the threshold difference intensity range, the finger is determined to be stable on the fingerprint sensing device.

According to one embodiment of the invention, determining that the finger is stable may be based on the amount of variation of the signal from the finger detector circuitry, wherein the stability condition is a threshold variation in the signal during a time duration, the finger is determined to be stable if the variation is below the threshold for the time duration.

Capturing a fingerprint image using the fingerprint sensing device may be performed when the device controller has been transitioned to the at least partly active mode.

The order or the finger detection using the finger detecting structures and the force determinations may be performed in any order or in parallel. The order of the force determination and the finger detection may advantageously be based on reducing the power consumption. For example, in one embodiment the step of determining the force applied on the fingerprint sensing device is performed subsequent to determining the area portion of the finger detecting structure being touched by the object, wherein the step of determining the force applied on the fingerprint sensing device is performed when the area portion of the finger detecting structure being touched by the object exceeds the predetermined threshold portion. In this case, the power consumption for operating the force sensing module may be higher than the power consumption for operating the finger detecting structures and the finger detecting circuitry, thereby it is advantageous to avoid using the force sensing module unnecessarily but instead only when finger detection has be established. Accordingly, the force sensing module is only triggered to be operative when it has been determined that a touch has been detected (that the area portion exceeds the threshold are portion) by the finger detector circuitry. The force sensor may be triggered to wake up by the pre-processing module of by circuitry provided with the finger detector circuitry.

In another embodiment, the step of determining the area portion of the finger detecting structure being touched by the object is performed subsequent to determining the force applied on the fingerprint sensing device, wherein the step of determining the area portion of the finger detecting structure being touched by the object is performed when the force exceeds the threshold force value. In this case, the power consumption for operating the finger detecting structures and the finger detecting circuitry may be higher than the power consumption for operating the force sensing module, thereby it is advantageous to avoid using the finger detecting structures and the finger detecting circuitry unnecessarily but instead only when the detected force is higher than the force threshold. Accordingly, the finger detector circuitry is only triggered to be operative when it has been determined that a sufficient force has been detected by the force sensing module. The finger detector circuitry may be triggered to wake up by the pre-processing module of by circuitry provided with the force sensing module.

According to a second aspect of the present invention, there is provided an electronic device comprising: a device controller configured to be arranged in an at least partly inactive mode or in an at least partly active mode; a fingerprint sensing device comprising a sensing area, the fingerprint sensing device is configured to capture a fingerprint image of a finger touching the sensing area, a finger detecting structure arranged adjacent to the fingerprint sensing device, the finger detecting structure being connected to finger detector circuitry configured to generate a signal indicative of an object touching at least a portion of the finger detecting structure, wherein a magnitude of the signal is indicative of the area portion of the finger detecting structure being touched by the object, a force sensing module configured to determine a force applied on the array of sensing elements; and a pre-processing module configured to transition the device controller from the at least partly inactive mode to the at least partly active mode when the force on the array of sensing elements is determined to exceed a predetermined threshold force and when the area portion of the finger detecting structure being touched by the object is determined to exceed a predetermined threshold area portion.

The pre-processing module may be further configured to: determine that the finger is stable with respect to the sensing area of the fingerprint sensing device according to a stability condition, wherein when the finger is determined to be stable on the fingerprint sensing device, transitioning, using the pre-processing module, the device controller from the at least partly inactive mode to the at least partly active mode.

The device controller may be configured to: when transitioned to the at least partly active mode, control the fingerprint sensing device to capture a fingerprint image.

The pre-processing module may be comprised with control circuitry provided with the fingerprint sensing device. Alternatively, the pre-processing module may be a component of the device controller.

As mentioned before, the force sensing module may be a hardware force sensor. Alternatively, the force sensing module is a processing unit part of pre-processing module configured to determine the force applied on the array of sensing elements based on analyzing a sequence of fingerprint images captured by the fingerprint sensing device.

In the at least partly active mode, the device controller may be configured to: provide an authentication request for a finger to the pre-processing module; receiving an authentication signal from the pre-processing module; and performing at least one action if the authentication signal indicates authentication success.

The electronic device may be a mobile phone, a tablet, a laptop, a desktop computer or any other thinkable present or future similar device.

The fingerprint sensing device and the finger detecting structures may be integrated in the same die, i.e. manufactured on the same chip.

Further embodiments of, and effects obtained through this second aspect of the present invention are largely analogous to those described above for the first aspect of the invention.

In summary, the present invention relates to a method for transitioning a device controller comprised with an electronic device from an at least partly inactive mode to an at least partly active mode, wherein the method comprises: determining the area portion of a finger detecting structure being touched by an object; determining a force applied on the fingerprint sensing device. When the area portion of the finger detecting structure being touched by the object exceeds a predetermined threshold area portion, and the force exceeds a predetermined threshold force value, transitioning, using the pre-processing module, the device controller from the at least partly inactive mode to the at least partly active mode. The invention also relates to such an electronic device.

BRIEF DESCRIPTION OF THE DRAWINGS

These and other aspects of the present invention will now be described in more detail, with reference to the appended drawings showing an example embodiment of the invention, wherein:

FIG. 4-6 are a schematic cross-section views of a portion of fingerprint sensing devices according to various embodiments;

DETAILED DESCRIPTION OF EXAMPLE EMBODIMENTS

In the present detailed description, various embodiments of the fingerprint sensing system and method according to the present invention are mainly described with reference to a mobile phone having an integrated fingerprint sensing device. Although this is convenient for many applications, it should be noted that many other kinds of electronic devices are applicable such as tablets, laptops, desktop computers, etc. Furthermore, the fingerprint sensing device is herein exemplary described having four finger detecting structures, however, other number of finger detecting structures is also applicable such as one, two, three, five, six, seven, eight, etc.

Figure 1:
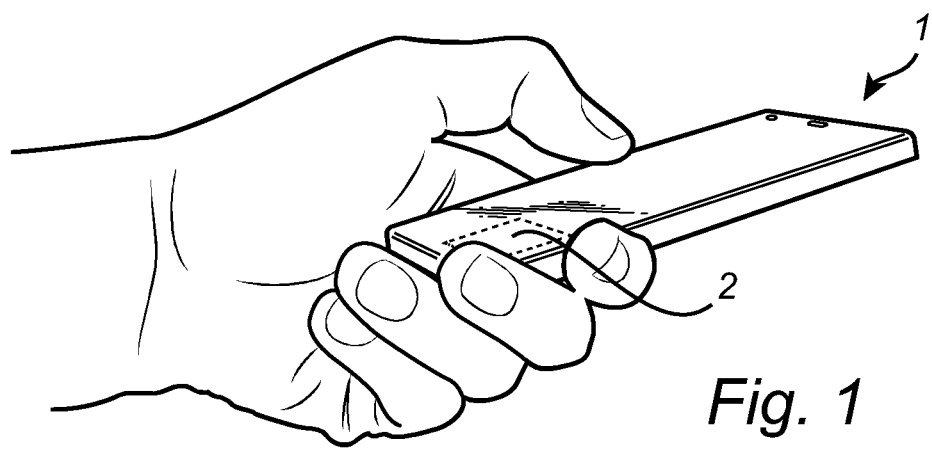
FIG. 1 schematically illustrates an electronic device according to an example embodiment of the present invention.

FIG. 1 schematically illustrates an application for a fingerprint sensing device according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc.

Figure 2:
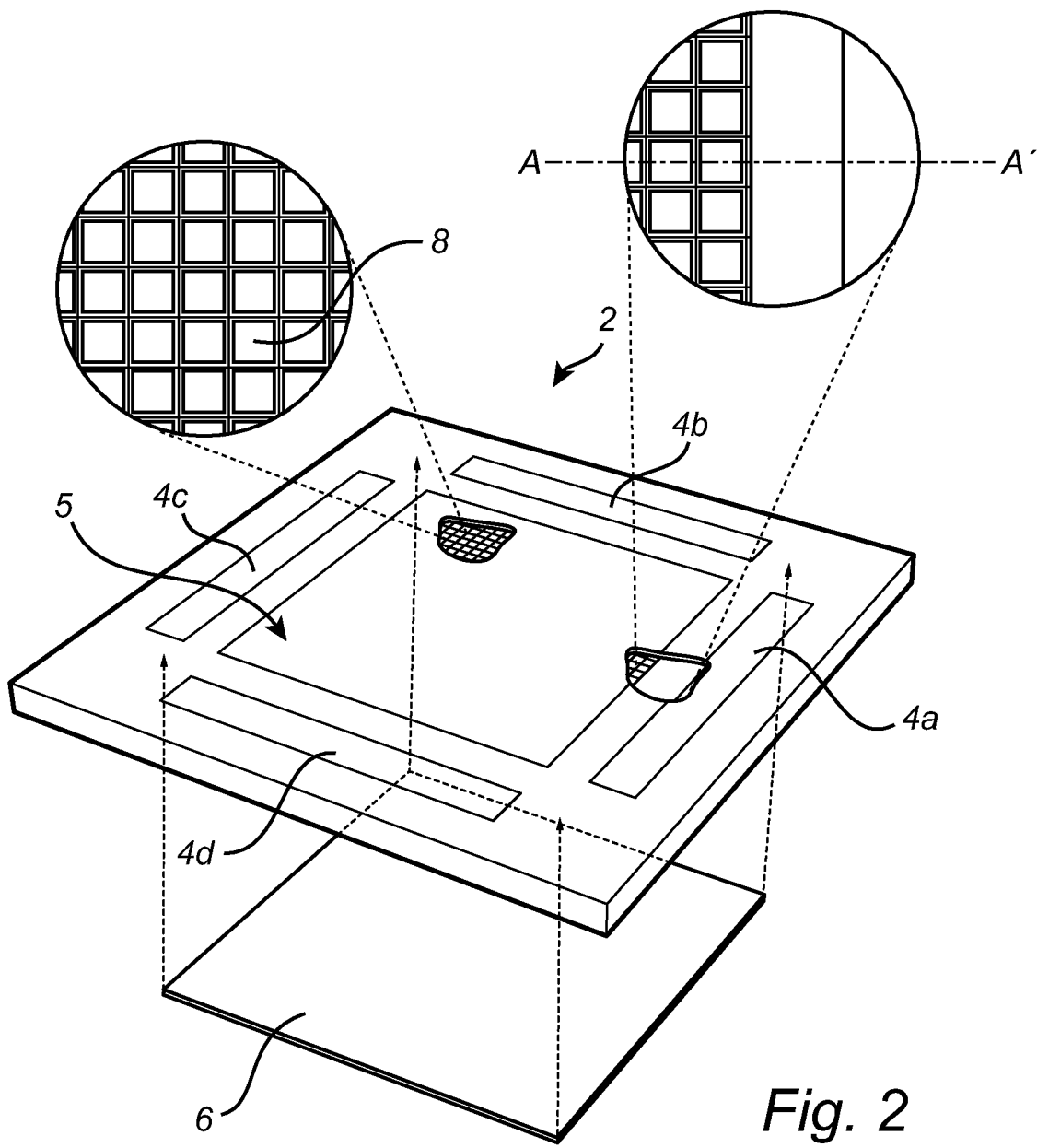
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, and finger detecting structures 4a-d. Although not shown in FIG. 2, the fingerprint sensing device 2 further comprises a power supply interface and a communication interface. The sensor array 5 comprises a large number of sensing elements 8 (only one of the sensing elements has been indicated with a reference numeral to avoid cluttering the drawing), each being controllable to sense a distance between a sensing structure comprised in the sensing element 8 and the surface of a finger contacting the top surface of the sensor array 5.

In a battery powered electronic device, such as the mobile phone 1 in FIG. 1, keeping the energy consumption of various sub-systems, including the fingerprint sensing device 2, as low as possible is of utmost importance. In particular, the energy consumption of sub-systems that are not used during a given time period should be zero or close to zero during that time period.

Therefore, although not shown in FIG. 2, the fingerprint sensing device 2 in FIG. 2 is also provided with a preprocessing module for determining if there is a finger present on the fingerprint sensing device and to activate a device controller when a finger is determined to be present so that the device controller and the fingerprint sensing device can be in a very low power state between finger detection events.

There is further schematically illustrated a force sensing module in the form of a force sensor 6 arranged under the array 5 of sensing elements 8. The force sensor is configured to determine a force applied on the fingerprint sensing device 2. A device controller (not shown) is configured to be transitioned to an at least partly active state when the determined force exceeds a threshold force and when a finger is detected on at least one of the finger detecting structures 4a-d.

In FIG. 2 the force sensor 6 is arranged under the array 5 of sensing elements 8. It should be noted however that the force sensor may equally well be arranged in other locations as long as a force applied on the fingerprint sensing device 2 may sensed. For example, the force sensor 6 may be arranged under the fingerprint sensor die, or next to the array 5 or sensing elements 8.

The force sensor 6 may be a piezoelectric material based sensor, a strain gauge, a resistive force sensor, or a quantum tunneling composite based force sensor, or an optical force sensor. The type of sensor may be selected for example depending on the configuration of the fingerprint sensor device configuration or the specific electronic device.

Figure 3:
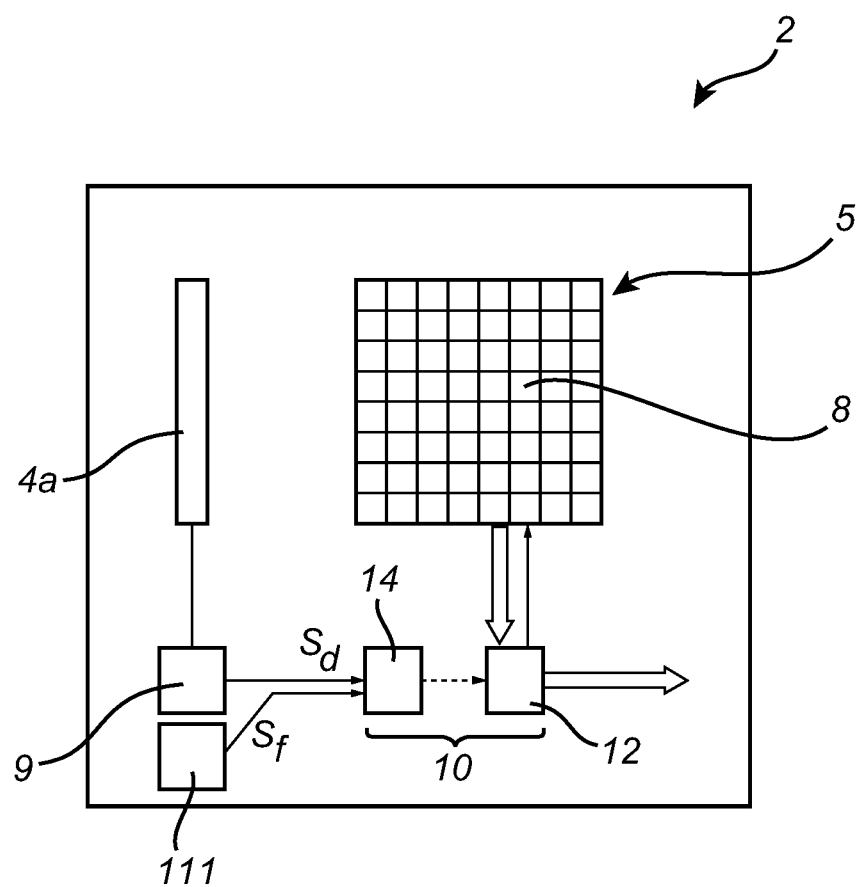
FIG. 3 is a block diagram of the fingerprint sensing device in FIG. 2.

Referring to the block diagram in FIG. 3 the fingerprint sensing device 2 comprises, in addition to the sensor array 5 and a finger detecting structure 4a shown in FIG. 2, a finger detector circuit 9, a force sensing module 111, and operation control circuitry 10 including a preprocessing module 14 and an image acquisition control circuit 12. In this exemplary embodiment, the preprocessing module 14 is part of the operation control circuitry 10. In other embodiments, the preprocessing module 14 may be part of the device controller (not shown). The device controller may be a controller of the electronic device comprising the fingerprint sensing device 2, thus in such case the device controller is external to the fingerprint sensing device 2.

The finger detector circuit 9 is connected to the finger detecting structure 4a for providing a finger detection signal $S_d$ indicative of a capacitive coupling between the finger detecting structure 4a and an object (such as a finger) approaching the finger detecting structure 4a. In FIG. 3, only one finger detecting structure 4a is shown. In case of several finger detecting structures 4a-d (see FIG. 2) they may all be connected to the same finger detector circuit 9, or each finger detecting structure may be connected to its own finger detector circuit.

As is schematically shown in FIG. 3, the preprocessing module 14 may in some (hence dashed line) embodiments be connected to the image acquisition control circuit 12. The image acquisition control circuit 12 is connected to the sensor array 5.

The force sensing module 111 may be embodied as a processor in itself or as part of another processing circuitry in case the force sensing module is configured to determine the applied force as software based force determination.

In other embodiments, the force sensing module 111 is a hardware force sensor. The force sensing module may in the case of a hardware force sensor comprise its own control circuitry for determining the force or the finger detector circuitry 9 may serve as control circuitry for the force sensor.

The force sensing module 111 is configured to provide a signal $S_f$ indicative of the force (relative of absolute force) applied on the fingerprint sensing device to the pre-processing module 14.

The device controller only wakes up (i.e. is transitioned to the at least partly active mode by the preprocessing module) if the signal provided by the finger detection circuitry 9 exceeds a detection threshold indicative of a threshold area portion of the finger detecting structures 4a-d being touched, and when the force sensing module 111 senses a force above a threshold force. The signals may be evaluated by a comparator in the finger detection circuitry 9 and in the force sensing module 111, or alternatively by a comparator in the preprocessing module 14. The device controller may subsequently control the image acquisition control circuit 12 to acquire an image using the array 5 of sensing elements 8.

Alternatively, the device controller is provided in the form of a controller comprised in the fingerprint sensing device, for example as the image acquisition control circuit 12, In other words, the image acquisition control circuit provided as part of the fingerprint sensing device is only woken up by the pre-processing module 14 (i.e. is transitioned to the at least partly active mode) if the signal provided by the finger detection circuitry 9 exceeds a detection threshold indicative of a threshold area portion of the finger detecting structures 4a-d being touched, and when the force sensing module senses a force above a threshold force.

Figure 4:
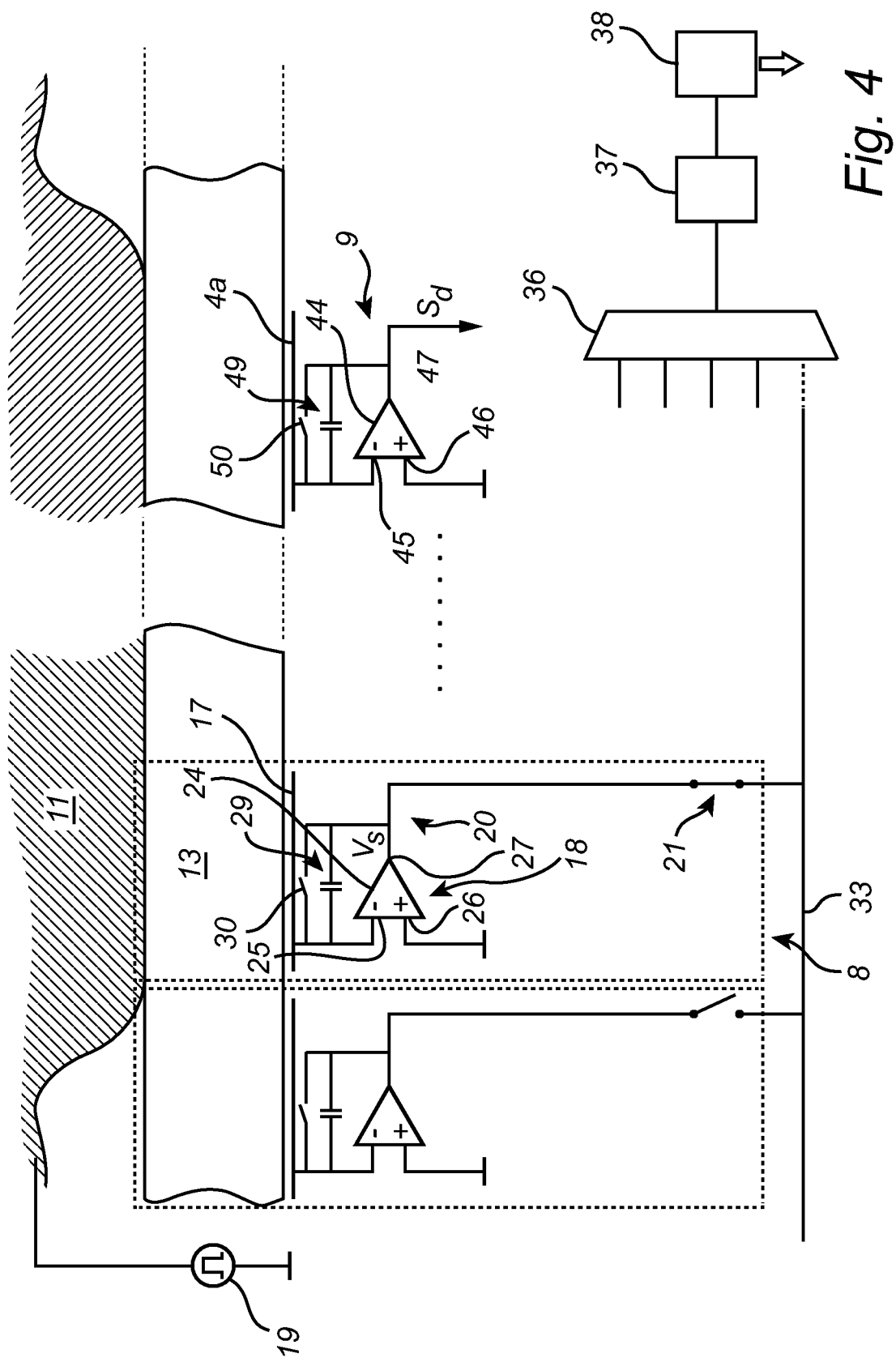

FIG. 4 is a schematic cross section of a portion of the fingerprint sensing device 2 in FIG. 2 taken along the line A-A' as indicated in FIG. 2 with a finger 11 placed on top of a protective dielectric top layer 13 covering the sensor array 5 and the finger detecting structure 4a. Referring to FIG. 4, the fingerprint sensing device 2 comprises an excitation signal providing circuit 19 electrically connected to the finger via a conductive finger drive structure (not shown in FIG. 4), a plurality of sensing elements 8, and a finger detection arrangement comprising the finger detecting structure 4a and a finger detection circuit 9 connected to the finger detecting structure 4a. Additionally, the fingerprint sensing device includes a force sensing module (not shown).

As is schematically indicated in FIG. 4, each sensing element 8 comprises a conductive sensing structure, here in the form of a metal plate 17 underneath the protective dielectric top layer 13, a charge amplifier 18, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 17, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 4, the first input 25 of the charge amplifier is virtually grounded.

When a time-varying potential is provided to the finger 11 by the excitation signal providing circuitry 19, a corresponding time-varying potential difference occurs between the sensing structure 17 and the finger 11.

The above-described change in potential difference between the finger 11 and the sensing structure 17 results in a sensing voltage signal $V_s$ on the output 27 of the charge amplifier 18.

When the indicated sensing element 8 is selected for sensing, the selection switch 21 is closed to provide the sensing signal to the readout line 33. The readout line 33, which may be a common readout line for a row or a column of the sensor array 5 in FIG. 2, is shown in FIG. 4 to be connected to a multiplexer 36. As is schematically indicated in FIG. 4, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 8 to a digital representation of the fingerprint pattern of the finger 11 on the sensor 2.

As is schematically indicated in FIG. 4, the finger detecting circuit 9 is here provided in the form of a charge amplifier similar in principle to the charge amplifier 18 comprised in the sensing element 8 described above.

Accordingly, the finger detecting circuit 9 comprises at least one amplifier stage, here schematically illustrated as an operational amplifier (op amp) 44 having a first input (negative input) 45 connected to the finger detecting structure 4a, a second input (positive input) 46 connected to sensor ground or another reference potential, and an output 47. In addition, the charge amplifier comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 4, the output of the finger detecting circuitry is a finger detection signal $S_d$ (in the form of a voltage) indicative of the capacitive coupling between the finger 11 and the finger detecting structure 4a.

Figure 5:
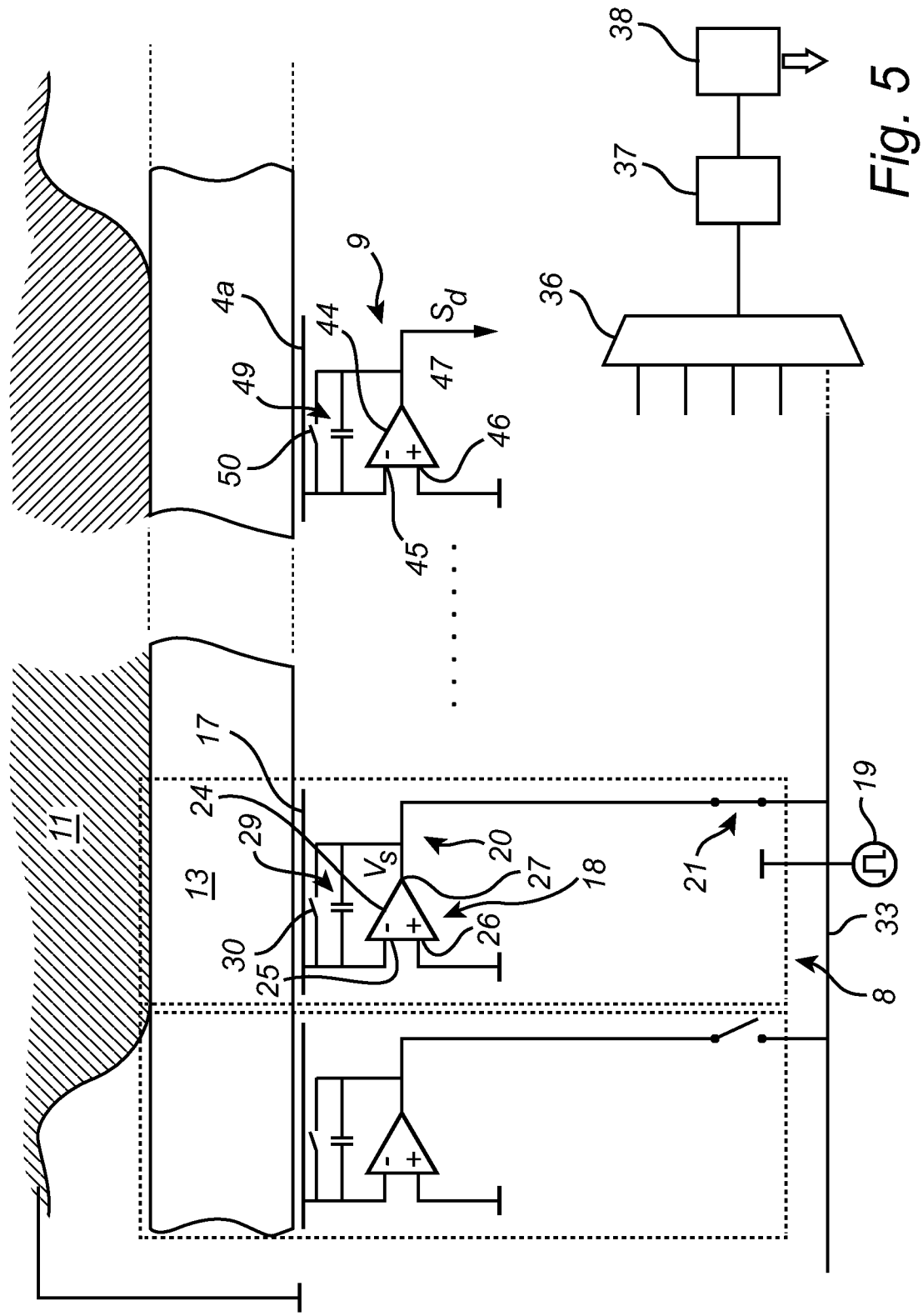

In FIG. 4, the finger 11 is shown as being connected to an excitation circuit 19 for providing the desired potential difference between the finger 11, and the sensing plates 17 of the sensor array 5 and the finger detecting structure 4a. As is conceptually shown in FIG. 5, the desired potential difference may alternatively be provided by changing the ground level of the fingerprint sensing device in relation to the ground level of the electronic device (such as mobile phone 1) in which the fingerprint sensing device 2 is included.

Furthermore, as is conceptually shown in FIG. 6, the potential difference may also be provided by changing the potential of the sensing structures 17, i.e. also the potential of the sensing structures (or at least a portion of the sensing structures) changes by applying the changing potential to the sensing structure.

There may be several ways to determine the coupling between a finger and the finger detecting structures. In one alternative embodiment, the finger detecting structure 4a may be locally controlled to alternate between a relatively low potential and a relatively high potential. In this alternative embodiment, the charge amplifier of the finger detecting circuit 9 may include a sense transistor having a gate constituting the first input 45.

Figure 7A:
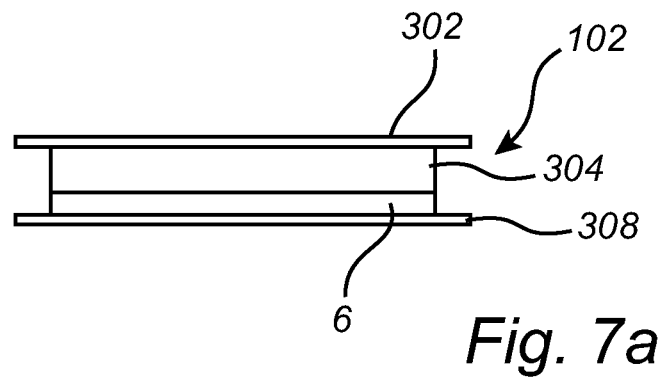
FIG. 7a-b illustrates two different placements of a force sensor relative a fingerprint sensing device.
Figure 7B:
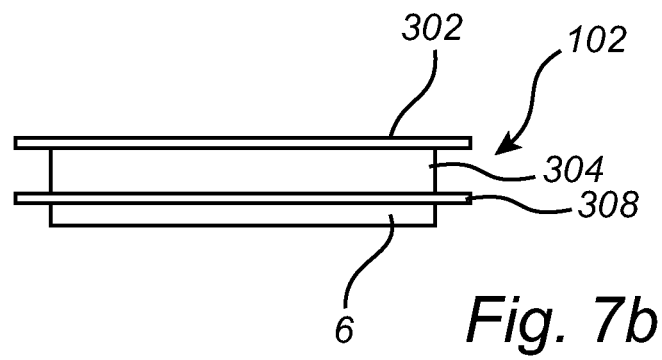

In FIG. 7a-b there are schematically shown cross-sections of a fingerprint sensor device 102 having an array of sensing elements, and a force sensor 6. The fingerprint sensing device 102 comprising a top surface 302 with the sensing elements (not shown here, see number 8 in FIG. 2) and a fingerprint sensor die 304. There is further included finger detecting structures although not shown. As shown in FIG. 7a, the force sensor 6 may be arranged under the fingerprint sensor die 304 on a substrate 308, in other words, the force sensor 6 may be interleaved between the fingerprint sensor die 304 and the substrate 308. Alternatively, as is shown in FIG. 7b, the force sensor 6 may be arranged under the substrate 308. The force sensor may for example be a resistive force sensor known in the art although other types of force sensor may also be used, such as optical sensors. Such a resistive force sensor may for example comprise a material (e.g. polymer) or structure whose resistance changes depending on the force applied to the material or structure causing a deformation of the material.

Figure 8:
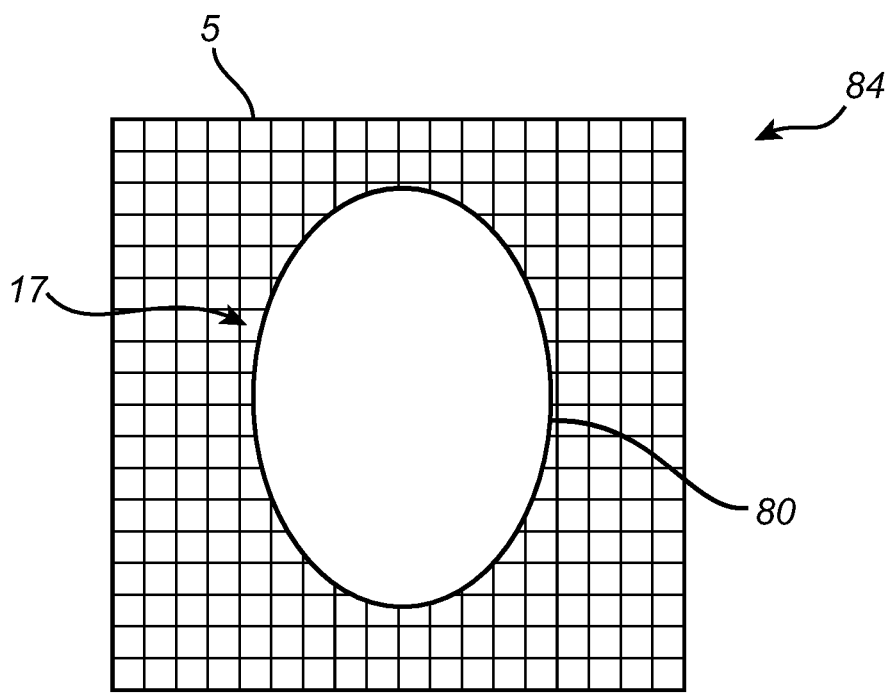
FIG. 8 conceptually illustrates an embodiment of the invention.

FIG. 8 conceptually illustrates a further possibility for detecting the presence of a finger. In FIG. 8, a finger detecting structure 84 is shown as a plurality of sub-parts of finger detecting structures. The sub-parts may be sensing structures 17 of the array 5 also shown in FIG. 2. When a predetermined threshold number of sensing structures 17 are covered by a finger (or any other conductive object) it may be determined that a threshold area portion 80 of the array 5 of finger detecting structures is covered. The area of the each of the sensing structures 17 is determined to either completely covered or not covered at all depending on the capacitive coupling between the sensing structure and the touching object. In other words, the total area touched by the object is the sum of an integer number of sensing structure 17 areas.

Figure 9:
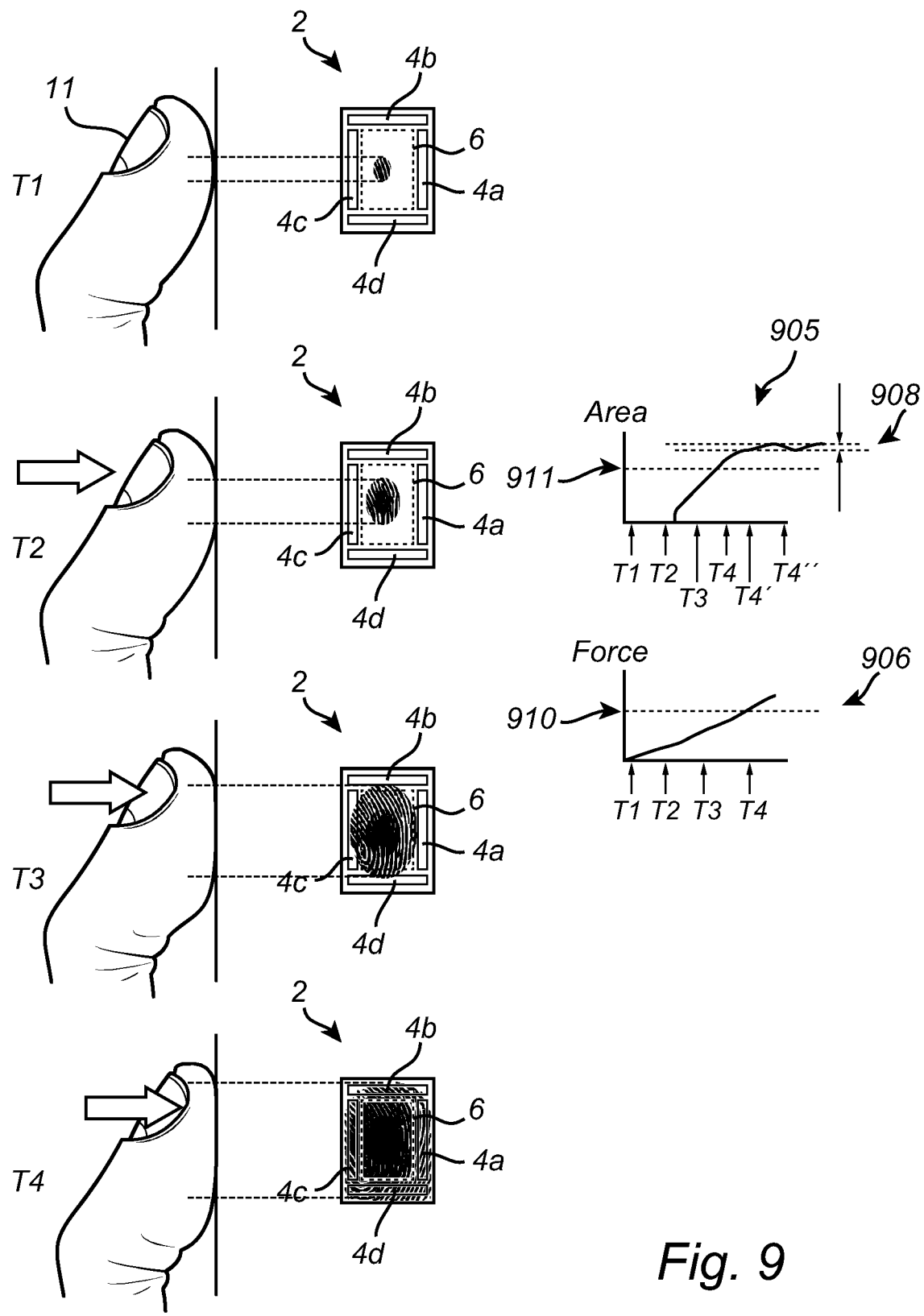
FIG. 9 illustrates a time series in a user case of embodiments of the invention.

FIG. 9 conceptually illustrates a finger 11 approaching a fingerprint sensing device having finger detecting structures 4a-d arranged adjacent to the array 5 of sensing elements and having a force sensing module here shown arranged under the array 5 which is suitable in case of a hardware force sensor 6. In case the force sensing module is a software based force sensing module it may be arranged in other suitable locations. There is further shown the time development of the area portion of the finger detecting structures being covered in graph 905 and the applied force on the fingerprint sensing device versus time in graph 906. In the presently described exemplary embodiment, the area portion relates to the combined area portion being touched for the finger detecting structures 4a-d. In other embodiments, the area portions may be individually considered with their own or with shared thresholds.

At time T1, the finger 11 is barely touching the fingerprint sensing device 2 and is not covering any part of the finger detecting structures 4a-d and is not applying any force measureable by the force sensor 6. Thus, at time T1, the covered area portion is zero and the applied force is close to zero as reflected in graphs 905 and 906.

At time T2, the finger is touching the fingerprint sensing device 2 and is now applying a higher force on the fingerprint sensing device 2 compared to at time T1. Still, no area portion of the finger detecting structures 4a-d is covered as illustrated in graph 905. However, at time T2 the force measured by the force sensor 6 has now increased although still below the threshold value 910.

Now turning to time T3 where the finger 11 has increased the applied force although still below the threshold 910. At time T3, the finger is now touching an area portion of the finger detecting structures 4a-d as is also illustrated in the graph 905. However, both the covered area portion and the detected force is below the respective threshold 911 and 910. This means that the device controller is still in its at least partly in-active state.

However, at time T4, the finger is now covering an area portion of the finger detecting structures 4*a-d* larger than the threshold 911 area portion and the detected force applied on the fingerprint sensor 2 exceeds the threshold force 910. Thus, the pre-processing module (not shown in FIG. 9) may cause the device controller to transition from the at least partly in active mode to an at least partly active mode, e.g. the device controller is "woken up". It may further according to embodiments be required that the covered are portion (graph 905) is within a threshold deviation 908 for a predetermined time duration from a time T4' to a time T4" before it is determined that a touch has been detected.

Figure 10:
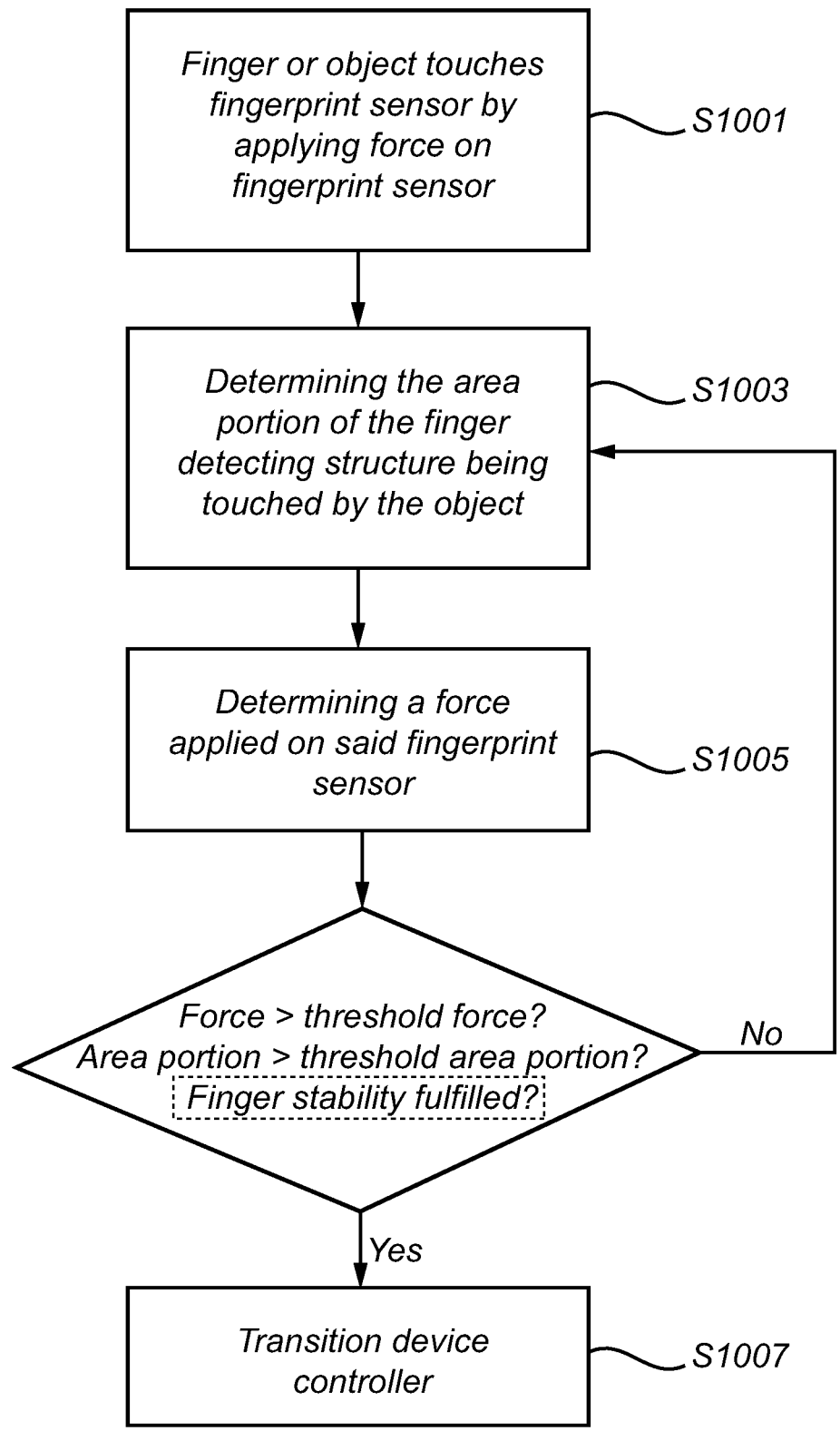
FIG. 10 is a flow-chart schematically illustrating a method according to an embodiment of the present invention.

FIG. 10 is a flow-chart of method steps according to embodiments of the invention. Firstly in step S1001, a finger or an object touches a fingerprint sensing device by applying a force on the fingerprint sensing device. In step S1003, the area portion covered by the object or finger on finger detecting structures is determined by finger detecting circuitry. Furthermore, in step S1005, the force applied on the fingerprint sensing device is determined by a force sensing module. It is checked whether the area portion of the finger detecting structure being touched by the object exceeds a predetermined threshold area portion, and the force exceeds a predetermined threshold force value. If the conditions regarding the applied force and the covered area portion are both fulfilled, the device controller is transitioned by a pre-processing module from an at least partly inactive mode to the at least partly active mode.

Optionally, and according to an embodiment of the invention, there is further required that the finger is determined to be stable on the fingerprint sensing device before proceeding to step S1007 to transition the device controller. The finger stability condition is particularly useful when the force sensing module is software based and the force sensing is performed only after the detected covered area portion exceeds the threshold area portion. When using a hardware force sensor, the stability required may in some embodiments be omitted. In both the case of hardware force sensor and software based force sensing the inclusion of the stability condition advantageously reduces the power consumption by avoiding false wake ups of the device controller.

Accordingly, in some embodiments of the invention, it may be required that the finger is stable on the fingerprint sensing device before transitioning the device controller. The stability condition is preferably included as a condition to be fulfilled in case of using a software based force sensing module. In such case, the determined force is a relative force based on a sequence of fingerprint images wherein one image is selected as a reference fingerprint image. At least one subsequent image is thereafter analyzed and compared with the selected reference image to detect differences between the images which may be indicative of topological changes in the fingerprint due to that the finger is pressed against the fingerprint sensing device. For example, a change in ridge width or valley depth determined from at least two fingerprint images may be used for determining a relative change in applied force.

Another possible way to determine the relative applied force is to analyze histograms of pixel values from the images in the sequence of images. In this case, it may be possible to estimate a force values or at least an indication whether the image is acquired at a high force or a low force by determining a "higher" image intensity and a "lower" image intensity from a first reference fingerprint image, subsequently, determining a "higher" image intensity and a "lower" image intensity from a second reference fingerprint image. It is then possible to determine a first intensity range from the difference between the higher intensity and the lower intensity in the first image, and a second intensity range from the difference between the higher intensity and the lower intensity in the second image. The force applied in the fingerprint sensing device may be based on e.g. a difference between the higher intensities of the images, and/or a difference between the first intensity range and the second intensity range.

Accordingly, when a reference fingerprint image is used for determining the applied force in relative terms, it is advantageous that the finger is stable on the fingerprint sensing device such that the reference fingerprint image may be reliably acquired, or at least such that a sufficiently high quality reference fingerprint image may be selected from the sequence of fingerprint images. It should ne noted that also in the case of using a hardware force sensor the stability condition may be included for further reduction in power consumption by reducing the number false wake-up events.

The stability condition may relate to avoiding a number of effects caused by finger movement on the fingerprint sensing device. A first effect may be referred to as a "rolling finger effect". When the finger 11 is initially "rolled" over the fingerprint sensing device 2, or for some other reason initially covers a first sub-area of the fingerprint sensing device 2, and thereafter stabilizes to cover a second, different sub-area or the entire sensing array of the fingerprint sensing device, a too early determination of the reference fingerprint image value(s) could result in an erroneous determination of the force.

Figure 11:
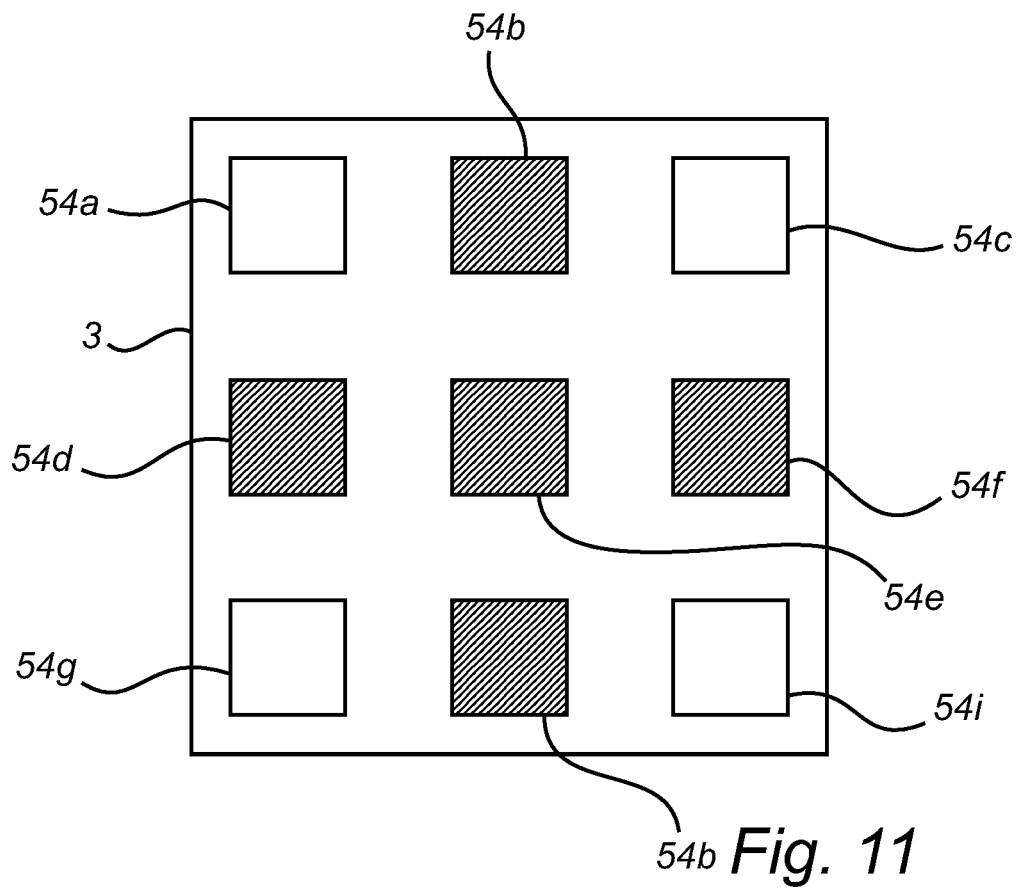
FIG. 11 schematically illustrates a first example of evaluation of stability of a finger on the fingerprint image.

To be able to identify the "rolling finger effect", a coverage parameter indicative of a spatial coverage of the array 5 of sensing elements of the fingerprint sensing device 2 can be determined, and evaluated in respect to a predefined condition. Referring to FIG. 11, the fingerprint sensing device 2 may, for example, have a number of predefined detection zones 54*a-i*, the coverage parameter may indicate which of the detection zones 54*a-i* are covered by the finger 5, and the condition may be that certain of the zones (here 54*b*, 54*d*, 54*e*, 54*f*, and 54*g*) are covered before a reference fingerprint image may be selected for force determination, or before it is determined to transition the device controller.

A second effect may be referred to as a "sliding finger effect". When the finger 11 is initially "sliding" over the fingerprint sensing device 2, and thereafter becomes stationary, a too early determination of the reference fingerprint image value(s) could result in an erroneous determination of the force.

Figures 12A, 12B, 12C:
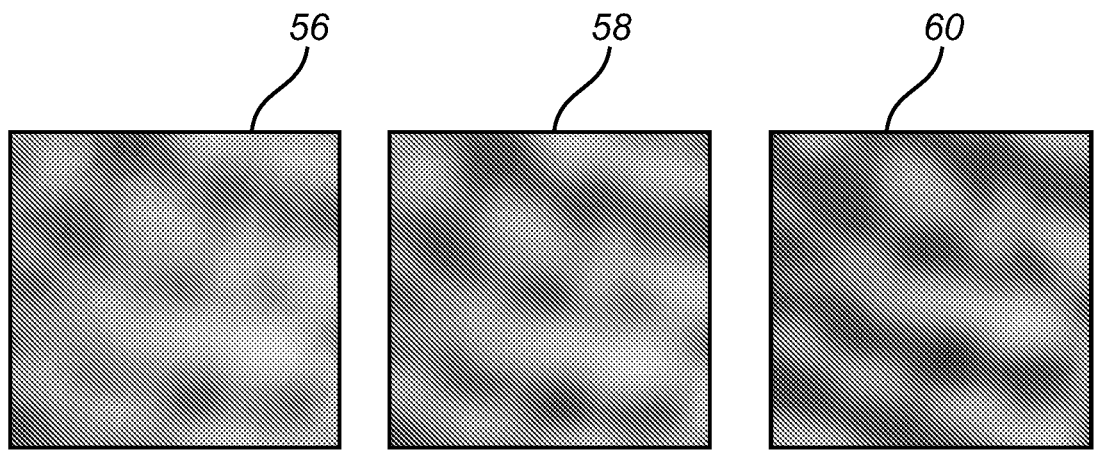
FIG. 12a-c schematically illustrates a second example of evaluation of stability of a finger on the fingerprint image.

To be able to identify the "sliding finger effect", a first difference parameter indicative of a difference in average intensity between successive fingerprint images in the first time-sequence of fingerprint images can be determined, and evaluated in respect to a predefined condition. FIGS. 12A-C schematically show three different fingerprint images 56, 58, and 60 in the first time-sequence of fingerprint images.

In the example of FIGS. 12A-C, the finger has moved between the acquisition of the fingerprint image 56 in FIG. 12A and the acquisition of the fingerprint image 58 in FIG. 12B, and between the acquisition of the fingerprint image 58 in FIG. 12B and the acquisition of the fingerprint image 60 in FIG. 12C. As can be expected, the average difference in image intensity (here the root-mean-squared per-pixel intensity difference) between the fingerprint image 56 in FIG. 12A, and the fingerprint image 58 in FIG. 12B is not below a predetermined difference threshold value, and the successive fingerprint images are therefore determined to be acquired while the finger 11 is sliding.

In this illustrative example, it was found that the difference in average image intensity (here the difference in RMS) between successive fingerprint images for the fingerprint image 60 in FIG. 12C was below the predetermined difference threshold value, indicating that the finger 11 is no longer sliding. Therefore, the above-described reference fingerprint image may be determined based on the fingerprint image 60 in FIG. 12C, and/or a subsequent fingerprint image.

A third effect may be referred to as a "ridge contact effect". In particular for dry fingers, the ridges of the fingerprint topography may initially make point contact with the fingerprint sensing device surface. Also in this case, a too early determination of the reference fingerprint image value(s) could result in an erroneous determination of the force.

Figures 13A, 13B, 13C:
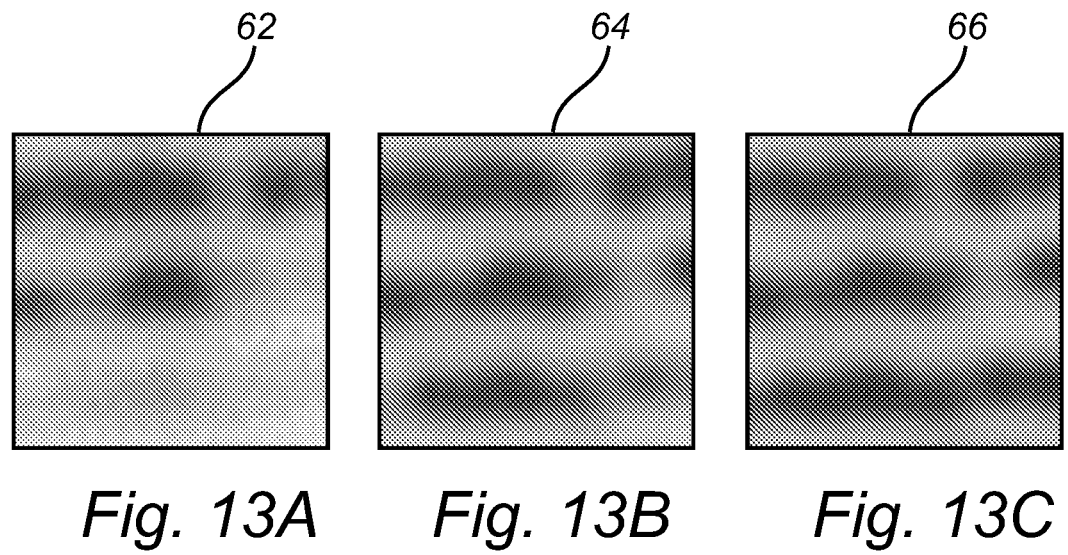
FIG. 13a-c schematically illustrates a third example of evaluation of stability of a finger on the fingerprint image.

To be able to identify the "ridge contact effect", a second difference parameter indicative of a difference in intensity range between successive fingerprint images in the first time-sequence of fingerprint images can be determined, and evaluated in respect to a predefined condition. FIGS. 13A-C schematically show three different fingerprint images 62, 64, and 66 in the first time-sequence of fingerprint images.

In the example of FIGS. 13A-C, the ridges of the fingerprint topography initially make point contact. With increasing finger pressure on the sensor surface, the points grow to lines, which eventually meet to form continuous ridges. In the process of the points growing to lines, it has been found that the intensity range (maximum intensity−minimum intensity) grows between successive fingerprint images. Based on this insight, the second difference parameter can be determined to fulfill a second difference condition when the difference in intensity range between successive fingerprint images is below a second predefined difference threshold value.

Figure 14:
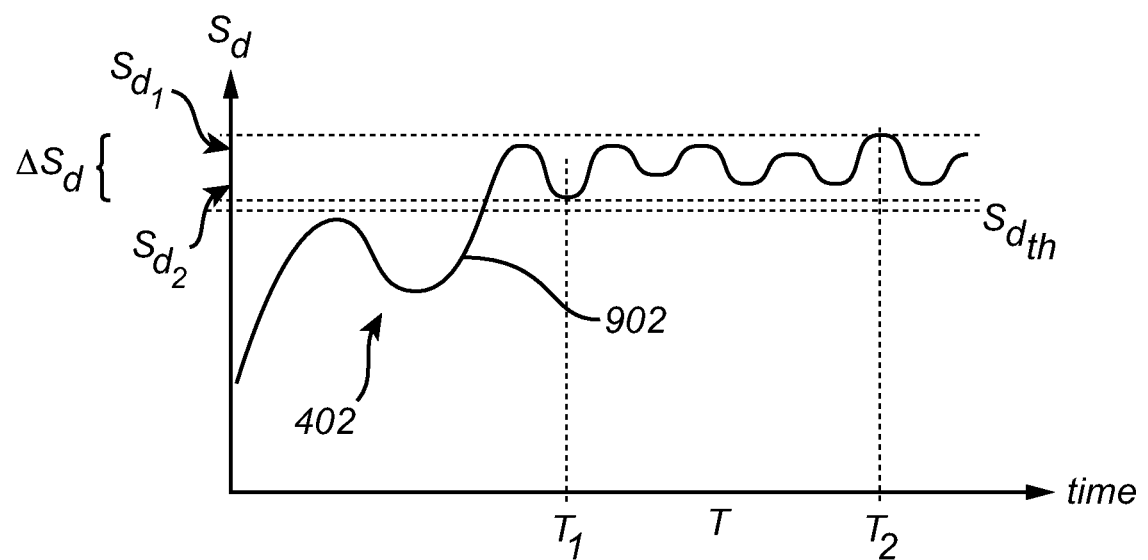
FIG. 14 conceptually describes determining stability of a finger on a fingerprint sensor device.

A further example of determining that the finger is stable on the fingerprint sensing device is illustrated in the graph FIG. 9 and in more detail in FIG. 14. In the graph 402 a signal represented by 902 indicative of the area portion being covered is for exemplary purposes illustrated versus time. In FIG. 14, the threshold for the area portion covered by the finger detecting structure is indicated as $S_{dth}$ and variation threshold is indicated as $\Delta S_d$. The variation threshold is given by upper stability deviation value $Sd_1$ and lower stability deviation value $Sd_2$. If the signal $S_d$ is within the stability variation threshold $\Delta S_d$ for a time during T from $T_1$ to $T_2$, it may be determine that the finger is stable on the fingerprint sensing device 2.

A control unit (e.g. a controller) in the invention may include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for transitioning a device controller included with an electronic device from an at least partly inactive mode to an at least partly active mode, the electronic device further including:
   a fingerprint sensing device comprising a sensing area, said fingerprint sensing device is configured to capture a fingerprint image of a finger touching the sensing area,
   a force sensing module configured to determine a force applied on said fingerprint sensing device,
   a finger detecting structure arranged adjacent to said fingerprint sensing device, said finger detecting structure being connected to finger detector circuitry configured to generate a signal indicative of an object touching at least a portion of said finger detecting structure, wherein a magnitude of said signal is indicative of the area portion of the finger detecting structure being touched by said object, and a pre-processing module, wherein said method comprises:

determining the area portion of the finger detecting structure being touched by said object;

determining a force applied on said fingerprint sensing device; wherein, when said area portion of the finger detecting structure being touched by said object exceeds a predetermined threshold area portion, and said force exceeds a predetermined threshold force value, transitioning, using the pre-processing module, said device controller from said at least partly inactive mode to said at least partly active mode.

2. The method according to claim 1, further comprising:

determining that said finger is stable with respect to the sensing area of said fingerprint sensing device according to a stability condition, wherein when said finger is determined to be stable on the fingerprint sensing device, transitioning, using the pre-processing module, said device controller from said at least partly inactive mode to said at least partly active mode.

3. The method according to claim 2, wherein said stability condition includes a coverage parameter indicative of a spatial coverage of said fingerprint sensing device, wherein said coverage parameter is determined to fulfill a coverage condition when at least a sub-area, having a predefined shape, of said fingerprint sensing device is covered by said object.

4. The method according to claim 2, wherein determining that said finger is stable is based on analyzing a difference between at least two fingerprint images in a sequence of fingerprint images.

5. The method according to claim 4, wherein said difference is a difference in image intensity between the fingerprint images.

6. The method according to claim 4, comprising determining a first intensity range in a first fingerprint image from the difference between a high intensity and a low intensity in the first fingerprint image, and a second intensity range in a second fingerprint image from the difference between a high intensity and a low intensity in the second fingerprint image;

determining a difference between the first intensity range and the second intensity range, and when the difference in intensity ranges is below a threshold intensity range difference value, determining that the finger is stable on the fingerprint sensing device.

7. The method according to claim 1, wherein determining that said finger is stable is based on the amount of variation of said signal from said finger detector circuitry, wherein said stability condition is a threshold variation ($\Delta S_d$) in said signal during a time duration (T), said finger is determined to be stable if said variation is below said threshold for said time duration.

8. The method according to claim 1, further comprising: when said device controller has been transitioned to said at least partly active mode, capturing a fingerprint image using said fingerprint sensing device.

9. The method according to claim 1, wherein said step of determining the force applied on the fingerprint sensing device is performed subsequent to determining said area portion of the finger detecting structure being touched by said object, wherein the step of determining the force applied on the fingerprint sensing device is performed when said area portion of the finger detecting structure being touched by said object exceeds said predetermined threshold portion.

10. The method according to claim 1, wherein said step of determining said area portion of the finger detecting structure being touched by said object is performed subsequent to determining the force applied on the fingerprint sensing device, wherein the step of determining said area portion of the finger detecting structure being touched by said object is performed when said force exceeds said threshold force value.

11. The method according to claim 1, wherein the electronic device comprises at least two finger detecting structures arranged adjacent to said fingerprint sensing device, each finger detecting structure being connected to finger detector circuitry configured to generate a signal indicative of an object touching at least a portion of the respective finger detecting structure, wherein a magnitude of each of said signals is indicative of the area portion of the respective finger detecting structure being touched by said object, wherein said step of determining the area portion of the finger detecting structure being touched by said object comprises determining the area portion being touched by said object for each finger detecting structure, wherein for transitioning, using the pre-processing module, said device controller from said at least partly inactive mode to said at least partly active mode, each of said area portion is required exceed a respective threshold area portion.

12. The method according to claim 1, wherein the electronic device comprises at least two finger detecting structures arranged adjacent to said fingerprint sensing device, each finger detecting structure being connected to finger detector circuitry configured to generate a signal indicative of an object touching at least a portion of the respective finger detecting structure, wherein a magnitude of each of said signals is indicative of the area portion of the respective finger detecting structure being touched by said object, wherein said step of determining the area portion of the finger detecting structure being touched by said object comprises determining a combined area portion being touched by said object based on the area portion being touch for each finger detecting structure, wherein for transitioning, using the pre-processing module, said device controller from said at least partly inactive mode to said at least partly active mode, said combined area portion is required exceed a threshold area portion.

13. The method according to claim 1, wherein each of said finger detecting structures is a capacitive plate for sensing a capacitive coupling between the finger and the capacitive plate.

14. An electronic device comprising:

a device controller configured to be arranged in an at least partly inactive mode or in an at least partly active mode;

a fingerprint sensing device comprising a sensing area, said fingerprint sensing device is configured to capture a fingerprint image of a finger touching the sensing area, a finger detecting structure arranged adjacent to said fingerprint sensing device, said finger detecting structure being connected to finger detector circuitry configured to generate a signal indicative of an object touching at least a portion of said finger detecting structure, wherein a magnitude of said signal is indicative of the area portion of the finger detecting structure being touched by said object, a force sensing module configured to determine a force applied on said array of sensing elements; and a pre-processing module configured to transition the device controller from said at least partly inactive mode to said at least partly active mode when said force on said array of sensing elements is determined to exceed a predetermined threshold force and when said area portion of the finger detecting structure being touched by said object is determined to exceed a predetermined threshold area portion.

15. The electronic device according to claim 14, wherein the pre-processing module is further configured to:
determine that said finger is stable with respect to the sensing area of said fingerprint sensing device according to a stability condition, wherein when said finger is determined to be stable on the fingerprint sensing device, transitioning, using the pre-processing module, said device controller from said at least partly inactive mode to said at least partly active mode.

16. The electronic device according to claim 15, wherein said stability condition includes a coverage parameter indicative of a spatial coverage of said fingerprint sensing device,
wherein said coverage parameter is determined to fulfill a coverage condition when at least a sub-area, having a predefined shape, of said fingerprint sensing device is covered by said object.

17. The electronic device according to claim 16, wherein determining that said finger is stable is based on analyzing a difference between at least two fingerprint images.

18. The electronic device according to claim 17, wherein said difference is a difference in image intensity between the fingerprint images.

19. The electronic device according to claim 15, wherein determining that said finger is stable is based on the amount of variation of said signal from said finger detector circuitry, wherein said stability condition is a threshold variation ($\Delta S_d$) in said signal during a time duration (T), said finger is determined to be stable if said variation is below said threshold for said time duration.

20. The electronic device according to claim 15, wherein said device controller is configured to:
when transitioned to said at least partly active mode, control the fingerprint sensing device to capture a fingerprint image.

21. The electronic device according to claim 14, wherein the pre-processing module is comprised with control circuitry provided with the fingerprint sensing device.

22. The electronic device according to claim 14, wherein the pre-processing module is a component of the device controller.

23. The electronic device according to claim 14, wherein the force sensing module is a force sensor.

24. The electronic device according to claim 14, wherein the force sensing module is a processing unit part of pre-processing module configured to determine the force applied on said array of sensing elements based on analyzing a sequence of fingerprint images captured by the fingerprint sensing device.

25. The electronic device according to claim 14, wherein, in said at least partly active mode, said device controller is configured to:
provide an authentication request for a finger to the pre-processing module;
receiving an authentication signal from the pre-processing module; and
performing at least one action if said authentication signal indicates authentication success.

26. The electronic device according to claim 14, wherein the fingerprint sensing device is a capacitive fingerprint sensor.

27. The electronic device according to claim 14, wherein the electronic device is a mobile phone.

28. The electronic device according to claim 14, wherein each of said finger detecting structures is a capacitive plate for sensing a capacitive coupling between the finger and the capacitive plate.

* * * * *